US009277110B2

(12) United States Patent
Yoneyama et al.

(10) Patent No.: US 9,277,110 B2
(45) Date of Patent: Mar. 1, 2016

(54) TRACKING DEVICE AND TRACKING METHOD FOR PROHIBITING A TRACKING OPERATION WHEN A TRACKED SUBJECT IS OBSTRUCTED

(71) Applicant: Olympus Corporation, Shibuya-ku, Tokyo (JP)

(72) Inventors: Hisashi Yoneyama, Hino (JP); Kento Koyano, Hachioji (JP)

(73) Assignee: Olympus Corporation, Tokyo (JP)

( * ) Notice: Subject to any disclaimer, the term of this patent is extended or adjusted under 35 U.S.C. 154(b) by 468 days.

(21) Appl. No.: 13/724,738

(22) Filed: Dec. 21, 2012

(65) Prior Publication Data

US 2013/0162839 A1 Jun. 27, 2013

(30) Foreign Application Priority Data

Dec. 22, 2011 (JP) ................... 2011-281724

(51) Int. Cl.
*G06T 7/20* (2006.01)
*H04N 5/232* (2006.01)

(52) U.S. Cl.
CPC .............. *H04N 5/23212* (2013.01); *G06T 7/20* (2013.01); *H04N 5/23219* (2013.01); *H04N 5/23293* (2013.01); *G06T 2207/30196* (2013.01)

(58) Field of Classification Search
CPC ........... G06T 2207/30196; G06T 7/20; H04N 5/23212; H04N 5/23219; H04N 5/23293

USPC .......................................... 348/169; 382/103
See application file for complete search history.

(56) References Cited

U.S. PATENT DOCUMENTS

| | | | | |
|---|---|---|---|---|
| 8,385,597 | B2 * | 2/2013 | Muramatsu | 382/103 |
| 2005/0004759 | A1 * | 1/2005 | Siegel | 701/223 |
| 2005/0031330 | A1 * | 2/2005 | Nonaka et al. | 396/104 |
| 2008/0080739 | A1 * | 4/2008 | Muramatsu | 382/103 |
| 2010/0315526 | A1 * | 12/2010 | Nakano et al. | 348/222.1 |
| 2011/0234885 | A1 * | 9/2011 | Muramatsu | 348/345 |

FOREIGN PATENT DOCUMENTS

JP 9-65193 3/1997

* cited by examiner

*Primary Examiner* — Behrooz Senfi
(74) *Attorney, Agent, or Firm* — John C. Pokotylo; Straub & Pokotylo

(57) ABSTRACT

A tracking device includes an imaging part for repeatedly acquiring image data on a subject image, a tracking processing part for setting a tracking position based on first image data to perform tracking processing on a subject in the tracking position based on second image data, and a relative distance information calculating part for calculating relative distance information using (1) a determined information about a distance to the tracking position and (2) a determined information about a distance to a surrounding area around the tracking position. When the tracking processing part determines that another subject in the surrounding area is located at the closer range than the subject in the tracking position, the tracking processing part prohibits tracking processing.

16 Claims, 10 Drawing Sheets

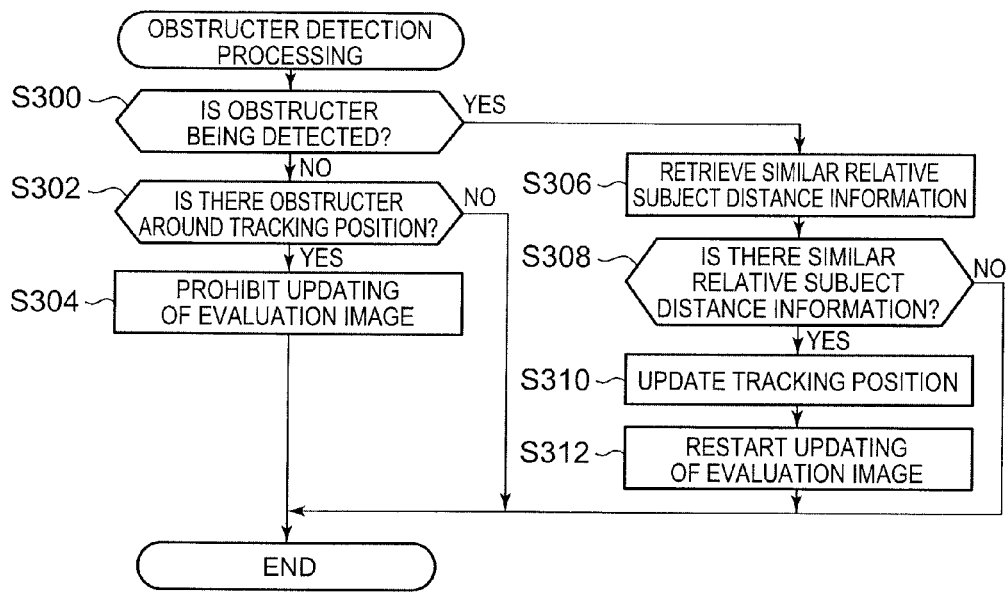
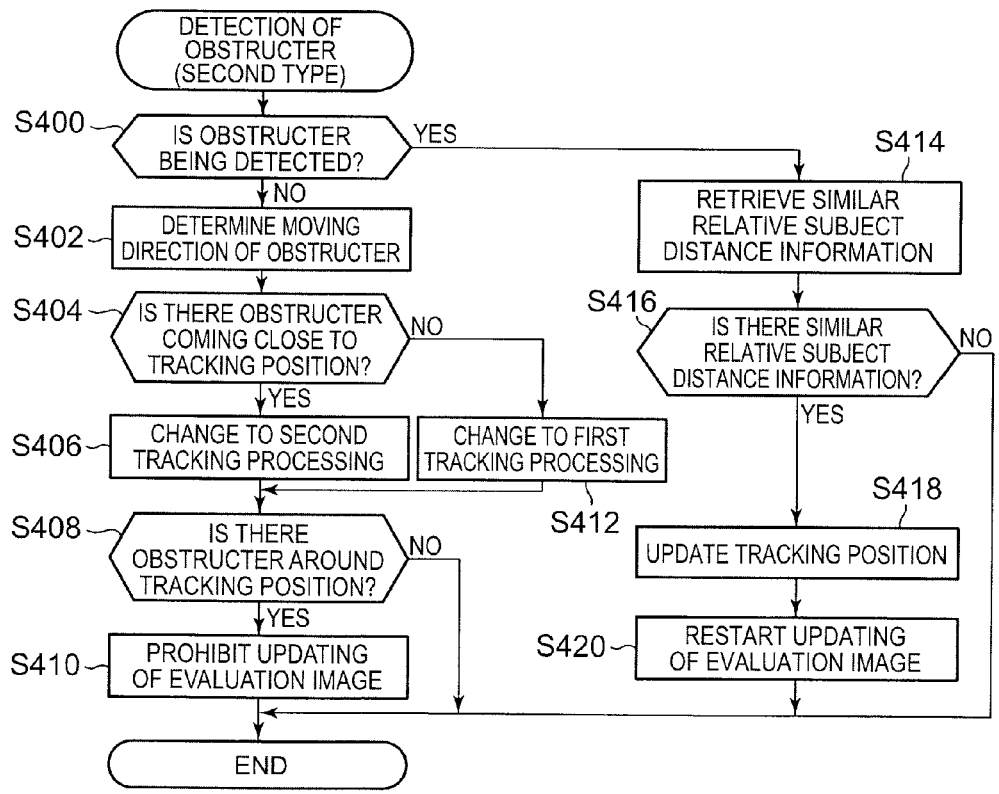

TRACKING DEVICE AND TRACKING METHOD FOR PROHIBITING A TRACKING OPERATION WHEN A TRACKED SUBJECT IS OBSTRUCTED

CROSS-REFERENCE TO RELATED APPLICATIONS

This application is based upon and claims the benefit of priority from the prior Japanese Patent Application No. 2011-281724, filed Dec. 22, 2011, the entire contents of which are incorporated herein by reference.

BACKGROUND OF THE INVENTION

1. Field of the Invention

The present invention relates to a tracking device and a tracking method for tracking a subject.

2. Description of the Related Art

Conventionally, when a picture of a moving body is taken or a moving image is taken, there has been known a technique for performing autofocus control (AF) and automatic exposure control (AE) to follow a specific subject. Tracking processing is used to follow such a specific subject.

During tracking, if a tracking target becomes obstructed, the tracking target may be lost or a wrong target may be tracked. To address this problem, Japanese Patent Application Publication No. 9-065193 teaches that, in tracking processing using brightness information, when a correlation value of a subsequent image with respect to a tracking target area (a reference image in Japanese Patent Application Publication No. 9-065193) set for a certain image is equal to or less than a preset reference value, it is temporarily determined that the subsequent image has no correlation with the reference image. Such processing is performed when the tracking target is obstructed to prevent erroneously determining that an obstruction is to be the tracking target.

BRIEF SUMMARY OF THE INVENTION

According to a first aspect of the present invention, there is provided a tracking device including: an imaging part for capturing a subject image and repeatedly acquiring image data on the subject image; a tracking processing part for setting a tracking position based on first image data of the repeatedly acquired image data to perform tracking processing on a subject in the tracking position based on second image data acquired after the first image data; and a relative distance information calculating part for calculating relative distance information using (1) a determined information about a distance to the tracking position and (2) a determined information about a distance to a surrounding area around the tracking position; wherein the tracking processing part determines whether another subject in the surrounding area is located at a closer range than the subject in the tracking position based on the relative distance information calculated, and responsive to a determination that another subject in the surrounding area is located at the closer range than the subject in the tracking position, prohibiting tracking processing tracking processing by the tracking processing part.

According to a second aspect of the present invention, there is provided a tracking device including: an imaging part for capturing a subject image and repeatedly acquiring image data on the subject image; a tracking processing part for setting a tracking position based on first image data of the repeatedly acquired image data to perform tracking processing on a subject in the tracking position based on second image data acquired after the first image data; and a relative distance information calculating part for calculating relative distance information using both (1) a determined information about a distance to the tracking position and (2) a determined information about a distance to a surrounding area around the tracking position, wherein responsive to a determination that another subject in the surrounding area is located at a closer range than the subject in the tracking position based on the relative distance information calculated, the tracking processing part determines, based on the determined information about a distance to the surrounding area, whether the other subject in the surrounding area is moving towards the tracking position, and performing different tracking processing by the tracking processing part based on a result of the determination of whether the other subject is moving towards the tracking position.

According to a third aspect of the present invention, there is provided a tracking method using an imaging part for capturing a subject image and repeatedly acquiring image data on the subject image, in which a tracking position is set based on first image data of the repeatedly acquired image data to perform tracking processing on a subject in the tracking position based on second image data acquired after the first image data, the tracking method including: calculating relative distance information using (1) a determined information about a distance to the tracking position and (2) a determined information about a distance a surrounding area around the tracking position; and determining whether another subject in the surrounding area is located at a closer range than the subject in the tracking position based on the relative distance information in the tracking position and the relative distance information calculated, and responsive to a determination that the other subject in the surrounding area is located at the closer range than the subject in the tracking position, prohibiting the tracking processing.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 7 is a flowchart showing a first example of obstructer detection processing.

FIG. 8 is a flowchart showing a second example of the obstructer detection processing.

DETAILED DESCRIPTION OF THE INVENTION

Example embodiments of the present invention will now be described with reference to the accompanying drawings.

Figure 1:
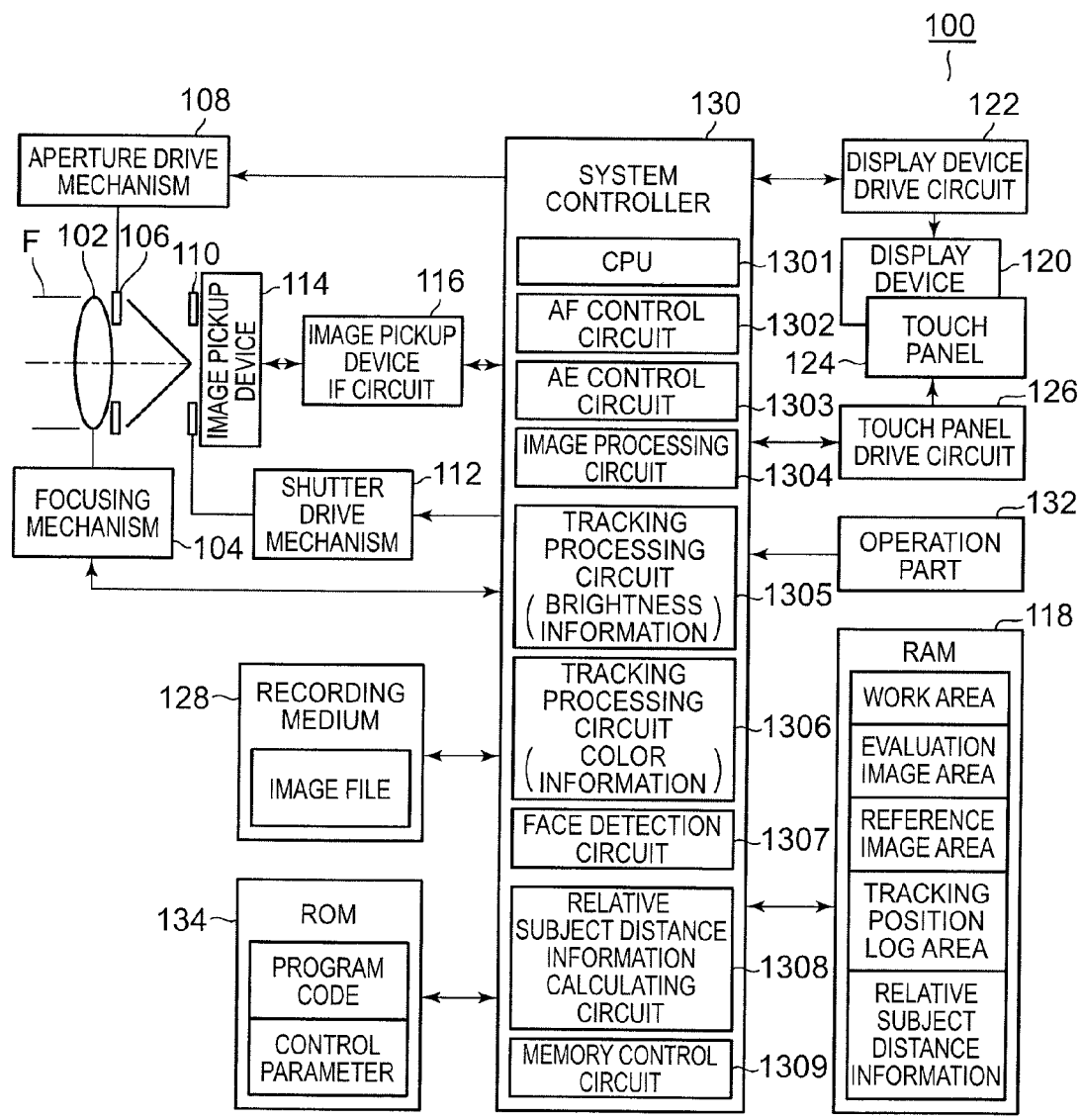
FIG. 1 is a block diagram showing an imaging apparatus including a structure as an example tracking device according to an example embodiment of the present invention.

FIG. 1 is a block diagram showing the structure of an imaging apparatus including a structure as an example of a tracking device according to an example embodiment of the present invention. An imaging apparatus 100 shown in FIG. 1 has a shooting optical system 102, a focusing mechanism 104, an aperture 106, an aperture drive mechanism 108, a shutter 110, a shutter drive mechanism 112, an image pickup device 114, an image pickup device interface (IF) circuit 116, a RAM 118, a display device 120, a display device drive circuit 122, a touch panel 124, a touch panel drive circuit 126, a recording medium 128, a system controller 130, an operation part 132, and a ROM 134.

The shooting optical system 102 is an optical system to guide a shooting light beam F from a subject, not shown, to a light-receiving surface of the image pickup device 114. This shooting optical system 102 may include multiple lenses such as a focus lens. The focusing mechanism 104 has a motor, its drive circuit, and the like. This focusing mechanism 104 drives the focus lens in the shooting optical system 102 in an optical axis direction (a direction indicated by the alternate long and short dash line in FIG. 1) under the control of a CPU 1301 in the system controller 130. The focusing mechanism 104 and the CPU 1301 constitute a focus lens drive part.

The extent to which the aperture 106 is opened can be adjusted to control the amount of shooting light beam F incident on the image pickup device 114 through the shooting optical system 102. The aperture drive mechanism 108 has a drive mechanism for driving the aperture 106. This aperture drive mechanism 108 drives the aperture 106 under the control of the CPU 1301 in the system controller 130.

The shutter 110 is constructed to put the light-receiving surface of the image pickup device 114 into a light-shielded state or an exposed state. This shutter 110 also controls the exposure time of the image pickup device 114. The shutter drive mechanism 112 drives the shutter 110 under the control of the CPU 1301 in the system controller 130.

The image pickup device 114 has the light-receiving surface on which the shooting light beam F from the subject condensed through the shooting optical system 102 forms an image. The light-receiving surface of the image pickup device 114 may include multiple pixels arranged two-dimensionally, and a color filter provided on the light incident side of the light-receiving surface. This image pickup device 114 converts an image (subject image) corresponding to the shooting light beam F and formed on the light-receiving surface into an electric signal (hereinafter called an image signal) corresponding to the amount of light. There are various types of known image pickup devices 114, such as CCD and CMOS for example. Further, there are various ways to array colors on the color filter, such as a Bayer array for example. Note that the described example embodiment is not intended to limit the structure of the image pickup device 114 to a specific structure, and the embodiment can use various types of image pickup devices.

The image pickup device IF circuit 116 drives the image pickup device 114 under the control of the CPU 1301 in the system controller 130. Further, under the control of the CPU 1301 in the system controller 130, the image pickup device IF circuit 116 reads the image signal obtained by the image pickup device 114, and performs analog processing, such as CDS (Correlated Double Sampling) processing or AGC (Automatic Gain Control) processing, on the read image signal. Further, the image pickup device IF circuit 116 converts the image signal after being subjected to the analog processing into a digital signal (hereinafter called image data).

The image pickup device 114 and the image pickup device IF circuit 116 constitute an imaging part.

The RAM 118 is, for example, an SDRAM having, as storage areas, a work area, an evaluation image area, a reference image area, a tracking position log area, and a relative subject distance information log area. The RAM 118 constitutes a storage part.

The work area is a storage area provided in the RAM 118 to temporarily store data produced in each part of the imaging apparatus 100, such as the image data obtained by the image pickup device IF circuit 116.

The evaluation image area is a storage area provided in the RAM 118 to temporarily store evaluation image data. The evaluation image data is image data in a frame including a subject as a tracking target during tracking processing to be described later. The tracking processing tracks this tracking target.

The reference image area is a storage area provided in the RAM 118 to temporarily store reference image data. The reference image data is image data in a frame in which the tracking target is to be searched for during the tracking processing to be described later. The tracking processing searches the reference image data.

The tracking position log area is a storage area provided in the RAM 118 to temporarily store a tracking position log. The tracking position log is a log in which tracking positions, obtained as a result of the tracking processing, are recorded.

The relative subject distance information log area is a storage area provided in the RAM 118 to temporarily store a relative subject distance information log (relative distance information log). The relative subject distance information log is a log in which changes in relative subject distance information (relative distance information) obtained by processing for calculating the relative subject distance information (relative distance information) in the tracking processing are recorded. The relative subject distance information is information corresponding to relative distance information between (1) a tracking position in image data in each frame and (2) a surrounding area located around the tracking position. The relative subject distance information will be called "relative distance information" below. The details of this relative distance information will be described later. In the embodiment, for example, the previous ten frames of relative distance information are recorded.

The display device 120 is, for example, a liquid crystal display (LCD) for displaying various images, such as a live view image and images recorded on the recording medium

128. The display device drive circuit 122 drives the display device 120 based on image data input from the CPU 1301 of the system controller 130 to display an image on the display device 120.

The touch panel 124 is integrally formed on a display screen of the display device 120 to detect a touch position of a user's finger or the like on a display screen of the display device 120. The touch panel drive circuit 126 drives the touch panel 124 and outputs a touch detection signal from the touch panel 124 to the CPU 1301 of the system controller 130. From the touch detection signal, the CPU 1301 detects a user's touch operation on the display screen and performs processing according to the touch operation.

The recording medium 128 is, for example, a memory card on which an image file obtained by a shooting operation is recorded. The image file is a file created with a predetermined header given to image data. In the header, data indicative of shooting conditions, data indicative of a tracking position, and the like are recorded as tag data.

To control the operation of the imaging apparatus 100, the system controller 130 has the CPU 1301, an AF control circuit 1302, an AE control circuit 1303, an image processing circuit 1304, tracking processing circuits 1305 and 1306, a face detection circuit. 1307, a relative subject distance information calculating circuit 1308, and a memory control circuit 1309.

The CPU 1301 controls each block outside of the system controller 130, such as the focusing mechanism 104, the aperture drive mechanism 108, the shutter drive mechanism 112, the display device drive circuit 122, the touch panel drive circuit 126, and the like, and controls the operation of each of the control circuitry inside the system controller 130. The CPU 1301, tracking processing circuits 1305, and 1306 constitute a tracking processing part.

The AF control circuit 1302 controls contrast AF processing. Specifically, the AF control circuit 1302 extracts high frequency components of the image data output by the image pickup device IF circuit 116, and adds up the extracted high frequency components to acquire an AF in-focus evaluation value for each AF area. The CPU 1301 evaluates the contrast of the image data according to this in-focus evaluation value and controls the focusing mechanism 104 to focus the focus lens of the shooting optical system 102.

The AE control circuit 1303 controls an AE operation. Specifically, the AE control circuit 1303 calculates subject brightness using the image data output by the image pickup device IF circuit 116. According to this subject brightness, the CPU 1301 calculates the amount of opening (aperture value) of the aperture 106 at the time of exposure, the time of releasing the shutter 110 (shutter speed value), the sensitivity of the image pickup device, the ISO sensitivity, and the like.

The image processing circuit 1304 performs various image processing on image data. The image processing includes color correction processing, gamma (γ) correction processing, compression processing, and the like. The image processing circuit 1304 also performs decompression processing on compressed image data.

Figure 2A:
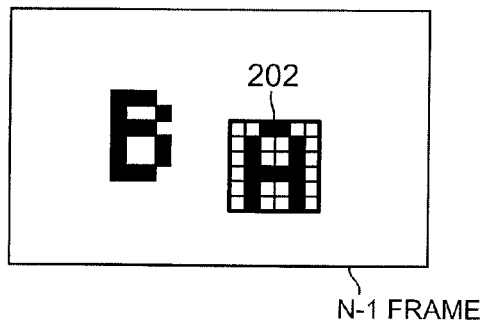
FIGS. 2A and 2B are illustrations showing an example of tracking processing using brightness information.

The tracking processing circuit 1305 (brightness tracking processing part) performs tracking processing using brightness information on image data. The tracking processing using this brightness information will be described in brief. In the tracking processing using the brightness information, for example, when a tracking target is set in (N−1) frame shown in FIG. 2A, image data in this (N−1) frame is stored as evaluation image data in the evaluation image area of the RAM 118. The tracking processing circuit 1305 sets, as fiducial image data, image data in a predetermined range 202 including the tracking target of the evaluation image data. The tracking processing circuit 1305 searches for a portion corresponding to the fiducial image data 202 of the reference image data in the subsequent tracking processing.

Figure 2B:
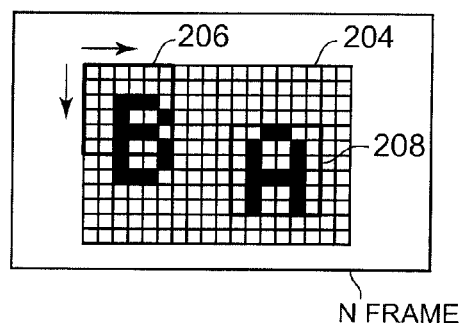

Taking tracking processing for N frame as an example, the tracking processing circuit 1305 first stores, as reference image data, image data in N frame in the reference image area of the RAM 118. The tracking processing circuit 1305 determines an amount of correlation between image data in a predetermined search range 204 of this reference image data and the fiducial image data 202 to search for the portion corresponding to the fiducial image data 202 of the reference image data. For example, the amount of correlation is determined from the sum of absolute differences between the fiducial image data and the reference image data (i.e., the result of determining absolute values of brightness differences pixel by pixel and adding up the absolute values). For example, suppose that the sum of absolute differences between reference image data in a reference image data area 206 shown in FIG. 2B and the fiducial image data 202 is determined. In this case, since the reference image data area 206 and the fiducial image data 202 are distinctly different image data, the sum of absolute differences becomes large. On the other hand, if the sum of absolute differences between a reference image data area 208 and the fiducial image data 202 is determined, the sum of absolute differences will become small. Thus, as the amount of correlation between a given reference image data area and the fiducial image data 202 increases, the sum of absolute differences becomes smaller. In the tracking processing using the brightness information, a portion with the largest amount of correlation, i.e., an area with the smallest sum of absolute differences is retrieved from the reference image data. In the example of FIG. 2B, the portion is the area 208. The tracking processing circuit 1305 records, in the tracking position log area, a position with the highest degree of coincidence in the area 208 as a tracking position. When there are two or more such positions, a position closest to the center of the area 208 is set as the tracking position, for example. During the next tracking processing, it is desired that the tracking processing circuit 1305 should set this tracking position as the start position of the tracking processing. This can reduce the time required for the tracking processing.

Figure 3A:
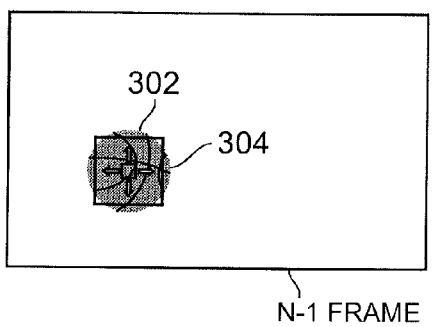
FIGS. 3A and 3B are illustrations showing an example of tracking processing using color information.

The tracking processing circuit 1306 (color tracking processing part) performs tracking processing using color information on image data. The tracking processing using this color information will be described in brief. In the tracking processing using the color information, a tracking color area is searched for, where the tracking color area is an area that can be determined to be the same color as, or similar color to, the color set in the evaluation image data. When a difference as a result of comparison between predetermined evaluation values related to the color information is within a predetermined range, the same color or a similar color is determined. As shown in FIG. 3A, when a position 302 in which a subject is located is specified in (N−1) frame, the tracking processing circuit 1306 acquires color information on the position 302 in evaluation image data. Then, the tracking processing circuit 1306 sets the position 302 as the start position of the tracking processing to search for an area having the same or similar color information as or to the position 302. Specifically, the tracking processing circuit 1306 acquires color information sequentially from the position 302 as the start position toward the periphery. When the acquired color information can be determined to be the same as or similar to the color information on the position 302, it is included in the area. On the other hand, when the acquired color information cannot be determined to be the same as or similar to the color information on the position 302, it is not included in the area. Thus, the tracking color area is retrieved. For example, when the subject is a monochromatic subject as shown in FIG. 3A, the tracking processing circuit 1306 sets a rectangular area 304 inscribed in the subject as the tracking color area. Further, for example, the tracking processing circuit 1306 sets, as the tracking position to be recorded in the tracking position log area, the barycentric position (i.e., at the center of mass of two or more bodies) of the tracking color area 304 (the same as the position 302 in the example of FIG. 3A). In the next tracking processing, the tracking processing circuit 1306 sets this tracking position as the start position of the tracking processing.

Figure 3B:
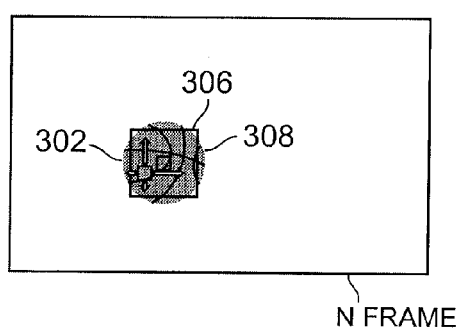

Taking tracking processing for N frame as an example, the tracking processing circuit 1306 sets the tracking position 302 in the (N−1) frame as the start position of the tracking processing in a predetermined search range of image data in the N frame stored as the reference image data shown in FIG. 3B. Then, as the tracking color area, the tracking processing circuit 1306 searches for an area that can be determined to be the same color as, or similar color to, the color of the tracking color area 304, sequentially from the periphery of the tracking position 302. In the example of FIG. 3B, the tracking processing circuit 1306 sets an area 306 as the tracking color area.

Figure 4A:
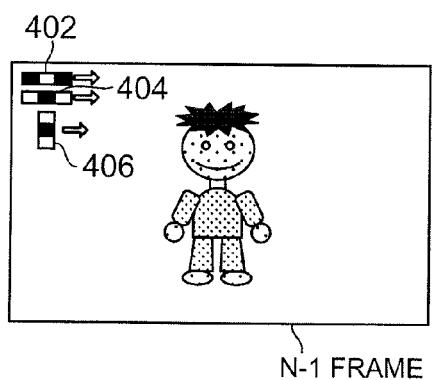
FIGS. 4A and 4B are illustrations showing an example of face detection processing.
Figure 4B:
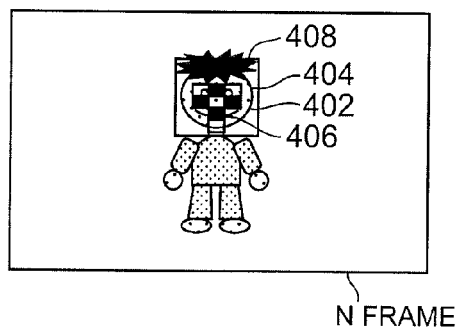

Referring now to face-based tracking, the face detection circuit 1307 detects the face of a subject (person) in image data. Here, face detection processing will be described in brief. In the face detection processing, the face detection circuit 1307 determines an amount of correlation between image data obtained in each frame and each of face parts 402, 404, and 406 as shown in FIG. 4A. The face part 402 is image data corresponding to a shadow pattern around the nose of the person, the face part 404 is image data corresponding to a shadow pattern around the eyes of the person, and the face part 406 is image data corresponding to a shadow pattern around the mouth of the person. The amount of correlation between the image data and the face parts 402, 404, and 406 becomes largest when a predetermined arrangement indicative of the face of the person is made, as shown in FIG. 4B. At this time, the face detection circuit 1307 determines that there is a face in an area 408 including the face parts 402, 404, and 406. Note that the size of the face parts 402, 404, and 406 may be changed according to the preset search size of the face. Here, the face area is a rectangular area in FIG. 4B, but the face area may also be a circular area.

The relative subject distance information calculating circuit 1308 (relative distance information calculating part) sets a predetermined area in image data as a subject distance information calculation area, and acquires relative distance information in this subject distance information calculation area (hereinafter called the distance information calculation area). As the relative distance information, for example, the AF in-focus evaluation value obtained by the AF control circuit 1302 as the contrast information can be used. The in-focus evaluation value (contrast information) does not show the subject distance directly, but it is information corresponding to the subject distance. Therefore, a comparison between the magnitudes of in-focus evaluation values (contrast information) can lead to a comparison between the magnitudes of subject distances.

The memory control circuit 1309 is an interface enabling the CPU 1301 or the like to perform control in order to access the RAM 118, the recording medium 128, and the ROM 134.

The operation part 132 includes various operating members that may be manually operated by the user. For example, the operation part 132 includes a release button, a movie button, a mode dial, a select key, a power button, and the like.

The release button has a first release switch and a second release switch. The first release switch is a switch turned on when the user presses the release button halfway. When the first release switch is turned on (i.e., closed), shooting preparation operations such as AF processing and the like are performed. The second release switch is a switch turned on when the user fully presses the release button. When the second release switch is turned on (i.e., closed), an exposure operation for taking a still image is performed.

The movie button is an operating member to give instruction to start or finish taking a moving image. When the user presses and releases the movie button, movie recording processing is started. Further, when the movie button is pressed and released during the movie recording processing, the movie recording processing is finished.

The mode dial is an operating member for selecting a shooting setting of the imaging apparatus 100. In the example embodiment, for example, as the shooting setting of the imaging apparatus, either a still image shooting mode or a movie recording mode, can be selected. The still image shooting mode is a shooting setting for taking a still image. On the other hand, the movie recording mode is a shooting setting for taking a moving image.

The select key is an operating member which allows a user to select and/or confirm an item, for example, on a menu screen. For example, when the user presses the select key, an item on the menu screen is selected and confirmed.

The power button is an operating member which allows a user to turn the power source of the imaging apparatus on or off. When the user presses the power button, the imaging apparatus 100 is activated to enter an operable state. When the power button is pressed while the imaging apparatus is activated, the imaging apparatus 100 enters a sleep state.

The ROM 134 stores program code for enabling the CPU 1301 to perform various processing. The ROM 134 also stores various control parameters, such as control parameters used for the operation of the shooting optical system 102, the aperture 106, the image pickup device 114, and the like, and control parameters used for the image processing circuit 1304 to perform image processing. Further, the ROM 134 stores face part data used for face detection in the face detection circuit 1307, data for displaying a tracking frame, and the like.

Figure 5:
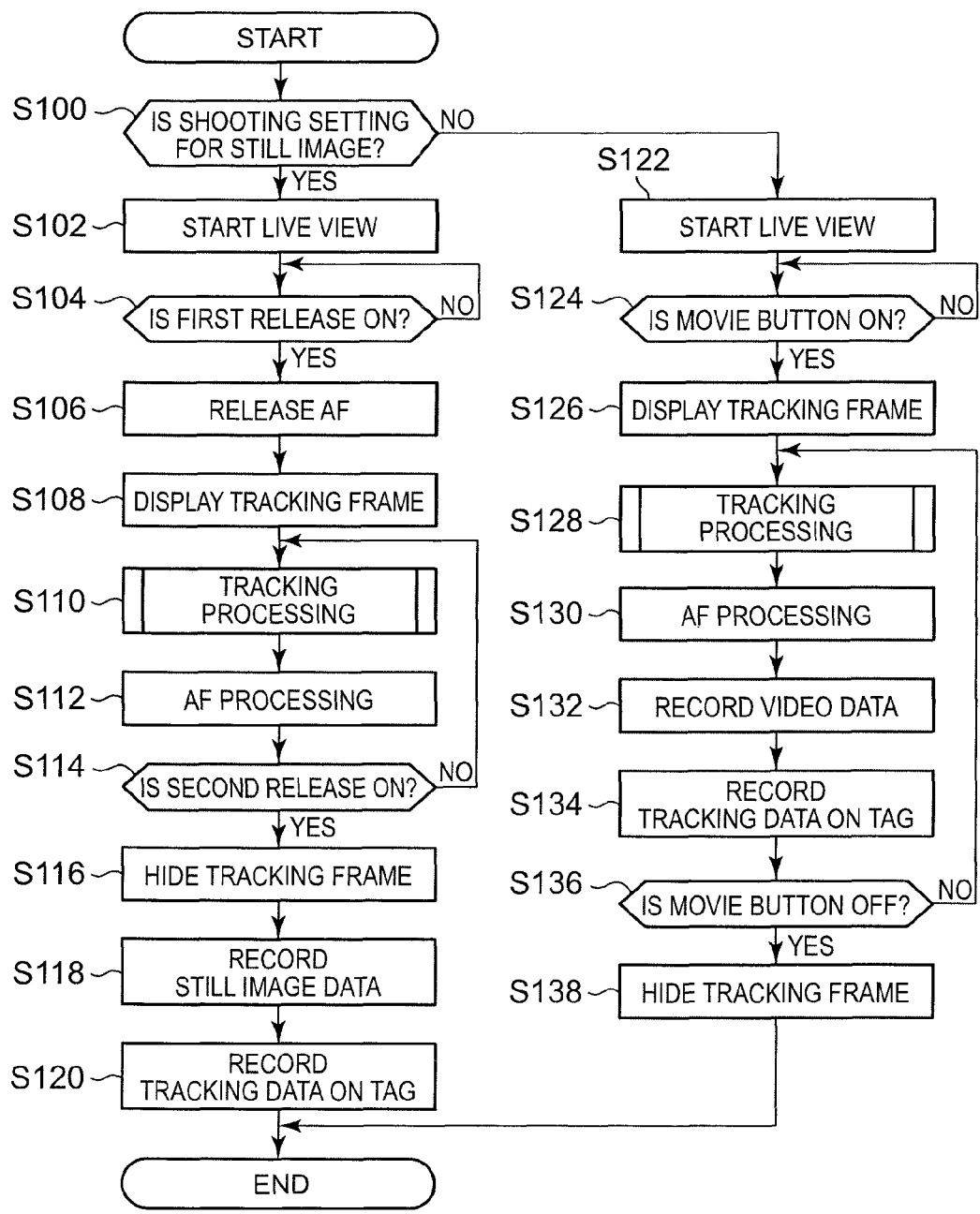
FIG. 5 is a flowchart showing a shooting operation of the imaging apparatus including the example tracking device.

Next, the operation of the imaging apparatus including the tracking device according to the example embodiment will be described. FIG. 5 is a flowchart showing a shooting operation of the imaging apparatus 100. The CPU 1301 reads necessary program code from the ROM 134 to perform the operations according to the flowchart shown in FIG. 5.

In S100, the CPU 1301 determines whether the current shooting setting of the imaging apparatus 100 is the still image shooting mode. As mentioned above, the shooting setting is set by using the mode dial.

When it is determined in S100 that the shooting setting is the still image shooting mode, the CPU 1301 starts a live view operation in S102. As the live view operation, the CPU 1301 controls the shutter drive mechanism 112 to release the shutter 110, and then controls the image pickup device IF circuit 116 to start imaging by the image pickup device 114. After that, as the result of imaging by the image pickup device 114, the CPU 1301 inputs the image data stored in the work area of the RAM 118 to the image processing circuit 1304. Then, the image processing circuit 1304 performs, on this image data, image processing for a live view display. Subsequently, the CPU 1301 outputs, to the display device drive circuit 122, the image data after being subjected to the image processing for the live view display. Then, the display device drive circuit 122 displays an image on the display device 120. Such a display operation is repeatedly performed to display images of a subject as a moving image display. This moving image display allows the user to watch the subject on the display device 120.

In S104, the CPU 1301 determines whether the first release switch is turned on (i.e., closed). The CPU 1301 continues the live view operation until it determines in S104 that the first release switch is turned on.

When determining in S104 that the first release switch is turned on (i.e., closed), the CPU 1301 performs in S106 release AF processing. In the release AF processing, the CPU 1301 scan-drives the focus lens to an in-focus position. During the scan driving, the CPU 1301 controls the focusing mechanism 104 to drive the focus lens of the shooting optical system 102 in one direction within a predetermined scan range, and the AF control circuit 1302 evaluates in-focus evaluation values sequentially calculated. Then, as a result of the evaluation of the in-focus evaluation values, the CPU 1301 stops the driving of the focus lens at a lens position at which the contrast becomes the maximum. Such scan driving is performed when a difference between the position of the focus lens and the in-focus position upon AF operation is great.

In S108, the CPU 1301 controls the display device drive circuit 122 to display a tracking frame on the display device 120. Here, the CPU 1301 controls the display device drive circuit 122 to display the tracking frame in a tracking target position on the screen of the display device 120. For example, the CPU 1301 may set a subject focused in release AF as the tracking target to display a tracking frame according to the subject. Alternatively, or in addition, when the face detection circuit 1307 detects a face, a tracking frame may be displayed according to the face. Alternatively, or in addition, when a subject displayed on the screen of the display device 120 is specified through the touch panel 124, the CPU 1301 may display a tracking frame on the subject.

In S110, the CPU 1301 together with tracking processing circuits 1305 and/or 1306 performs tracking processing. The details of this tracking processing will be described later.

In S112, the CPU 1301 performs AF processing to focus on the subject in the tracking position, and performs AE processing to optimize the exposure to the subject in the tracking position.

In AF processing after the tracking processing, the CPU 1301 with AF control circuit 1302 drives the focus lens to the in-focus position by means of scan driving or wobbling driving. In the wobbling driving, the CPU 1301 determines whether the in-focus evaluation value calculated by the AF control circuit 1302 upon driving of the focus lens is increased from the in-focus evaluation value at the previous lens position. Then, when the in-focus evaluation value is increased, the CPU 1301 minutely drives the focus lens to move in the same direction as the last time. On the other hand, when the in-focus evaluation value is decreased, the focus lens is minutely driven to move in a direction opposite to the last time. The CPU 1301 repeats such operations at high speed to drive the focus lens to the in-focus position little by little.

Further, in the AE processing, the CPU 1301 calculates the amount of opening (aperture value) of the aperture 106 at the time of exposure and the time of opening the shutter 110 (shutter speed value) to set the brightness of the subject in the tracking position calculated by the AE control circuit 1303 to a predetermined proper amount (proper exposure).

In S114, the CPU 1301 determines whether the second release switch is turned on (i.e., closed). When determining in S114 that the second release switch is not turned on, the CPU 1301 continues to perform the tracking processing in S110 and the AF processing in S112. Thus, in the still image shooting mode, the tracking processing is continued until the second release switch is turned on.

On the other hand, when determining in S114 that the second release switch is turned on (i.e., closed), the CPU 1301 controls the display device drive circuit 122 in S116 to hide the tracking frame.

In S118, the CPU 1301 performs processing for recording still image data on the recording medium 128. In this case, the CPU 1301 controls the shutter drive mechanism 112 to close the shutter 110. After that, the CPU 1301 controls the aperture drive mechanism 108 to stop down the aperture 106 to the aperture value previously calculated. Subsequently, the CPU 1301 controls the shutter drive mechanism 112 to open the shutter 110 for the opening time previously calculated so that the image pickup device 114 will perform imaging (exposure). After that, the CPU 1301 causes the image processing circuit 1304 to process still image data obtained through the image pickup device 114. Then, the CPU 1301 attaches a header to the still image data processed by the image processing circuit 1304 to generate a still image file, and records the generated still image file on the recording medium 128.

In S120, the CPU 1301 appends, to the tag of the still image file previously recorded on the recording medium 128, tracking data indicative of the tracking position obtained as a result of the tracking processing in S110. After that, the CPU 1301 ends the operation shown in FIG. 5.

On the other hand, when it is determined in S100 that the shooting setting is the movie recording mode, the CPU 1301 starts the live view operation in S122.

In S124, the CPU 1301 determines whether the movie button is pressed (and released). The CPU 1301 continues the live view operation until it determines in S124 that the movie button is pressed (and released) again.

When determining in S124 that the movie button is pressed (and released), the CPU 1301 controls the display device drive circuit 122 in S126 to display a tracking frame on the display device 120.

In S128, the CPU 1301 with tracking processing circuits 1305 and/or 1306 performs tracking processing. The details of this tracking processing will be described later.

In S130, the CPU 1301 with AF control circuit 1302 and AE control circuit 1303 performs AF processing for focusing on a subject in a tracking position, and AE processing for properly exposing to the subject in the tracking position. In the AF processing in S130, wobbling driving (as described above with reference to S112) is performed to drive the focus lens to an in-focus position.

In S132, the CPU 1301 performs processing for recording movie data on the recording medium 128. In this case, the CPU 1301 controls the aperture drive mechanism 108 to set the aperture 106 to the aperture value calculated in the AE processing. Then, the CPU 1301 causes the image pickup device 114 to perform imaging (exposure) for the time corresponding to the shutter speed value calculated in the AE processing.

After the exposure, the CPU 1301 generates a movie file and records it on the recording medium 128. Further, the CPU 1301 causes the image processing circuit 1304 to process movie data obtained through the image pickup device 114, and records, in a movie file, the movie data processed by the image processing circuit 1304.

In S134, the CPU 1301 records tracking data indicative of the tracking position obtained as a result of the tracking processing in S128 on to the tag at the same time when recording the movie file previously recorded on the recording medium 128.

In S136, the CPU 1301 determines whether the movie button is turned off (e.g., pressed and released again). When determining in S136 that the movie button is not turned off, the CPU 1301 performs processing following the tracking processing in S128. Thus, in the movie recording mode, the tracking processing and recording of movie data are continued until the movie button is turned off.

On the other hand, when determining in S136 that the movie button is turned off, the CPU 1301 controls the display device drive circuit 122 in S138 to hide the tracking frame. After that, the CPU 1301 ends the operation shown in FIG. 5.

Figure 6:
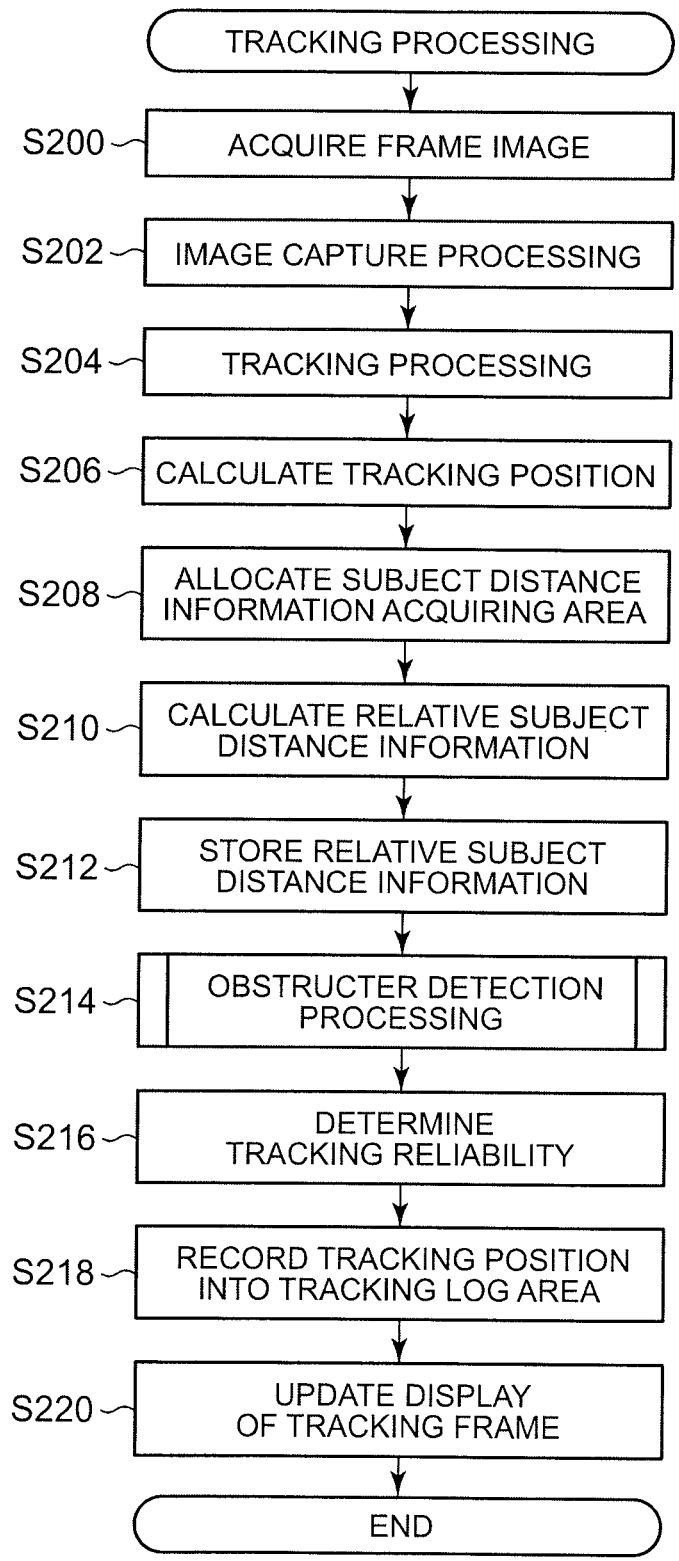
FIG. 6 is a flowchart showing tracking processing as a tracking method according to the example embodiment of the present invention.

Next, tracking processing (recall S110 and S128) in the example embodiment will be described. FIG. 6 is a flowchart showing the tracking processing in the example embodiment.

In S200, the CPU 1301 controls the image pickup device IF circuit 116 to perform imaging through the image pickup device 114. In S202, the CPU 1301 stores, into the RAM 118, image data obtained by the image pickup device IF circuit 116 as a result of imaging through the image pickup device 114. Here, the image data obtained in the first tracking processing is set as evaluation image data. Therefore, the CPU 1301 stores the image data obtained in the first tracking processing into the evaluation image area of the RAM 118. On the other hand, image data obtained in the second or subsequent tracking processing is set as reference image data. Therefore, the CPU 1301 stores the image data obtained in the second or subsequent tracking processing into the reference image area of the RAM 118. Then, when no obstructer is detected as a result of performing obstructer detection processing (to be described later) on the evaluation image data and the reference image data, the CPU 1301 writes the reference image data over the evaluation image data. When updating the evaluation image data is prohibited by the obstructer detection processing (to be described later), the CPU 1301 prohibits writing the image data over the evaluation image area of the RAM 118. However, the CPU 1301 stores the image data into the reference image area to calculate relative distance information to be described later.

In S204, the CPU 1301 causes the tracking processing circuit 1306 to perform tracking processing using color information or tracking processing using brightness information. Both of these types of tracking processing may also be performed. Since the tracking processing using color information and the tracking processing using brightness information are described above, redundant description will be omitted. In the first tracking processing, since only the evaluation image data is acquired, processing in S204 and subsequent steps is omitted. In the following, the description will be continued on the assumption that both the evaluation image data and the reference image data are acquired.

In S208, the CPU 1301 allocates a distance information calculation area for image data. In a first example, the CPU 1301 allocates distance information calculation areas to an area for a tracking position in the image data and two or more areas around the tracking position, respectively. In a second example, the CPU 1301 allocates a distance information calculation area to the entire range in the image data. It is preferred that the size of each area should be the same size. The distance information calculation area may also be the same area as the AF area.

In S210, the CPU 1301 causes the relative subject distance information calculating circuit 1308 to acquire, for each area, relative distance information in the distance information calculation area allocated in S208. In this example embodiment, the in-focus evaluation value (contrast information) is used, for example, as the relative distance information as mentioned above.

In S212, the CPU 1301 stores, in the relative subject distance information log area of the RAM 118, the acquired relative distance information in the distance information calculation area.

In S214, the CPU 1301 performs obstructer detection processing. The obstructer detection processing is processing for detecting the presence or absence of an obstructer obstructing a subject as a tracking target to determine the final tracking position according to the detection result. The details of two types of obstructer detection processing will be described later with reference to FIGS. 7 and 8.

In S216, the CPU 1301 determines the reliability of the tracking position adopted as a result of the obstructer detection processing. In the case of the tracking processing using color information, the reliability of the determined tracking position is determined, for example, from the intensity of the reference image data. Specifically, the CPU 1301 determines that the tracking position is reliable when the intensity of the tracking position of the reference image data is equal to or more than a predetermined value. The threshold value used for determining this reliability can be set arbitrarily. In the case of the tracking processing using brightness information, the CPU 1301 determines the reliability, for example, from data of each pixel of the reference image data. Specifically, the CPU 1301 determines that the tracking position is reliable when the sum of differences between adjacent pixels in the tracking target area in the reference image data is equal to or more than a predetermined value.

In S218, the CPU 1301 records the final tracking position in the tracking position log area of the RAM 118. In the next (next frame) tracking processing, the CPU 1301 sets this final tracking position as the start position of the tracking processing. However, the CPU 1301 might not record the tracking position when either no obstructer is detected around the tracking position in the obstructer detection processing in S214, or when it is determined in the determination of reliability in S216 that the tracking position is unreliable.

In S220, the CPU 1301 controls the display device drive circuit 122 to update the display position of the tracking frame to a position corresponding to the tracking position recorded in S218. After that, the CPU 1301 ends the tracking processing in FIG. 6.

Two examples of obstructer detection processing are now described. Here, the term "obstructer" includes a potential obstructer.

The first example of obstructer detection processing will be described with reference to FIG. 7. Here, description will be made on the assumption that distance information calculation areas are allocated to the area of a tracking position in image data and two or more areas around the tracking position.

In S300, the CPU 1301 determines whether an obstructer is being detected. When it is determined in S300 that no obstructer is detected, the CPU 1301 determines in S302 whether there is an obstructer in a surrounding area defined around the tracking position. When there is no obstructer around the tracking position, it means that it means that a distance to a surrounding area defined around the tracked position is about the same as a distance to the tracked position. On the other hand, when there is an obstructer around the tracking position, it means that the distance to the obstructer is less than the distance to the tracking position (i.e., that the obstructer is closer to the camera than the tracked subject is to the camera). From such a difference in subject distance, the presence or absence of an obstructer is determined. As mentioned above, in one example embodiment, the presence or absence of an obstructer is determined using contrast information as an example of relative distance information. The details of this specific processing will be described later.

When it is determined in S302 that there is an obstructer around the tracking position, the CPU 1301 prohibits updating of the evaluation image data in S304. In this case, it is desired that the CPU 1301 should also prohibit the calculation of a tracking position in the next tracking processing. On the other hand, the CPU 1301 calculates the relative distance information for latest image data.

When it is determined in S302 that there is no obstructer around the tracking position, the CPU 1301 ends the processing in FIG. 7. In this case, the CPU 1301 sets the tracking position calculated in S206 as the final tracking position.

When an obstructer is detected in S300 (i.e., when it is determined in S302 that there is an obstructer around the tracking position), the CPU 1301 proceeds the processing to S306. In S306, the CPU 1301 retrieves relative distance information similar to the relative distance information in the current tracking position from the relative distance information calculated for respective distance information calculation areas. As this specific processing, it is assumed that relative distance information (contrast information) whose difference from the relative distance information (contrast information) in the tracking position falls within a threshold range, is retrieved.

As a result of retrieval in S306, the CPU 1301 determines in S308 whether the relative distance information similar to the relative distance information in the current tracking position could be retrieved. The term "similar" means relative distance information (contrast information) whose difference from the relative distance information (contrast information) in the above-mentioned tracking position falls within a predetermined threshold range.

As a result of retrieval in S306, when it is determined in S308 that the relative distance information similar to the relative distance information in the current tracking position could not be retrieved, the CPU 1301 ends the processing in FIG. 7. In this case, the CPU 1301 determines that there is an obstructer around the tracking position (i.e., that an obstructer is being detected).

As a result of retrieval in S306, when it is determined in S308 that the relative distance information similar to the relative distance information in the current tracking position could be retrieved, the CPU 1301 proceeds the processing to S310. Then, in S310, the CPU 1301 updates the tracking position to a position in a distance information calculation area from which the similar relative distance information was retrieved. Subsequently, in S312, the CPU 1301 restarts updating of the evaluation image data. After that, the CPU 1301 ends the processing in FIG. 7.

Next, the second example of obstructer detection processing will be described with reference to FIG. 8. In this example, it will be assumed that the distance information calculation area is allocated to the entire range in image data.

In S400, the CPU 1301 determines whether an obstructer is being detected. When it is determined in S400 that no obstructer is being detected, the CPU 1301 determines the moving directions of obstructers in S402. A specific method of determining whether there is an obstructer will be described later.

As a result of determining the moving directions of the obstructers, the CPU 1301 determines in S404 whether there is an obstructer coming close to the tracking position within a surrounding area defined around the tracking position. When determining in S404 that there is an obstructer coming close to the tracking position, the CPU 1301 proceeds the processing to S406. Then, in S406, the CPU 1301 changes tracking processing performed by the tracking processing circuit 1305, 1306 from a first processing under which is it assumed that there is no obstructer, to second processing under which it is assumed that there is an obstructer.

As mentioned above, in the tracking processing using color information performed by the tracking processing circuit 1306, a tracking color area that is determined to be the same color as, or a similar color to, the color set in the evaluation image data is searched for. As the second processing in the tracking processing using color information, for example, it is assumed that the resolution of color information to be searched for is greater than that in the first processing. Specifically, the resolutions of both color information (the number of color segments of image data) acquired from the evaluation image data and color information searched from the reference image data are greater than preset initial parameters, respectively. This enables the tracking processing circuit 1306 to determine, as a tracking color area, only a color closer to the color set in the evaluation image data.

Further, in the tracking processing using brightness information performed by the tracking processing circuit 1305, reference image data indicative of a state in which there is an obstructer is stored as second processing separately from the reference image data currently stored in the reference image area. This reference image data separately stored is used when the obstructer has left the captured image data.

In S408, the CPU 1301 determines whether there is an obstructer around the tracking position. The content of this specific processing will be described later.

When determining in S408 that there is an obstructer around the tracking position, the CPU 1301 prohibits updating of the evaluation image data in S410. In this case, it is desired to also prohibit updating of the tracking position. On the other hand, the CPU 1301 calculates the relative distance information. The CPU 1301 uses the latest image data as image data for which the relative distance information is calculated.

When determining in S408 that there is no obstructer around the tracking position, the CPU 1301 ends the processing in FIG. 8. In this case, the CPU 1301 sets the tracking position calculated in S206 as the final tracking position.

When an obstructer is being detected in S400 (i.e., when it is determined in S408 that there is an obstructer around the tracking position), the CPU 1301 proceeds the processing to S414. In S414, the CPU 1301 retrieves relative distance information similar to the relative distance information in the current tracking position from the relative distance information calculated for respective distance information calculation areas.

After the retrieval in S414, the CPU 1301 determines in S416 whether the relative distance information similar to the relative distance information in the current tracking position could be retrieved. As a result of retrieval in S414, when determining in S416 that the relative distance information similar to the relative distance information in the current tracking position could not be retrieved, the CPU 1301 ends the processing in FIG. 8. In this case, the CPU 1301 determines that there is any other obstructer around the tracking position (i.e., that an obstructer is being detected).

As a result of retrieval in S414, when it is determined in S416 that the relative distance information similar to the relative distance information in the current tracking position could be retrieved, the CPU 1301 proceeds the processing to S418. In S418, the CPU 1301 updates the tracking position to a position in a distance information calculation area from which the similar relative distance information could be retrieved. Subsequently, in S420, the CPU 1301 restarts updating of the evaluation image data. After that, the CPU 1301 ends the processing in FIG. 8.

Next, specific processing for determining the presence or absence of an obstructer when contrast information is used as the relative distance information will be described. When the contrast information is used as the relative distance information, a relationship between the magnitude of contrast information in the tracking position and the magnitude of surrounding contrast information varies depending on the presence or absence of an obstructer. To better describe this relationship, contrast AF will be described first.

As mentioned above, contrast AF is a system for adjusting the position of the focus lens so that the contrast information in an AF area allocated to the image data is maximized. Here, in order to move the focus lens to a position at which the contrast information is maximized, the CPU 1301 first determines the direction of the in-focus position relative to the current focus lens position. In other words, the CPU 1301 needs to determine whether the current position of the focus lens is located on a far distance side of the in-focus position, or a near distance side of the in-focus position. As a specific example method therefor, the CPU 1301 performs a micro vibration (wobbling) operation of the focus lens to such a degree that does not affect an image obtained through the image pickup device 114 as mentioned above. Then, as a result of the wobbling operation of the focus lens, the CPU 1301 detects the direction in which the focus lens needs to moved to increase the contrast information.

Figure 9:
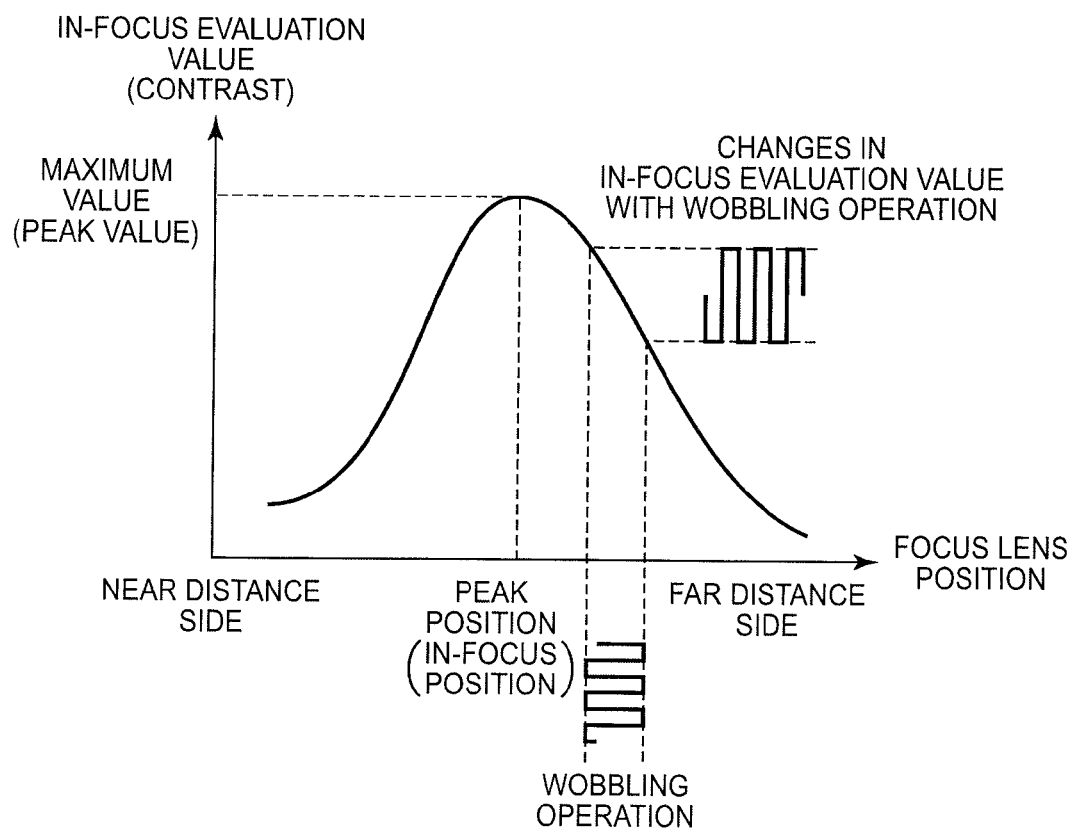
FIG. 9 is a graph showing an example of changes in contrast information with respect to a focus lens position during contrast AF.

FIG. 9 is a graph showing an example of changes in contrast information (in-focus evaluation value) with respect to the focus lens position during the contrast AF operation. As shown in FIG. 9, the contrast information with respect to the focus lens position reaches a maximum value (peak value) in the in-focus position. On the other hand, the contrast value becomes smaller as the focus lens moves away from the in-focus position (peak position) to the far distance side (rear focus side) or the near distance side (front focus side). Further, since the focus lens minutely vibrates during the wobbling operation, the as the contrast information used as the in-focus evaluation value repeatedly increases and decreases. From these increases and decreases, the moving direction of the focus lens is detected.

Here, it is considered a case where an obstructer exists around the tracking position on condition that a subject in the tracking position is the focusing target. The obstructer obstructs the subject as the tracking target, existing on the near distance side with respect to the subject as the tracking target (i.e., the obstructer is closer to the camera than the subject being tracked). When the subject as the tracking target is in focus, the obstructer is in the state of rear focus. Therefore, when the contrast information in the position of the obstructer is calculated, the value becomes smaller relatively than the contrast information in the tracking position.

Thus, the relationship of the magnitude of the contrast information with respect to the tracking position varies depending on the presence or absence of an obstructer. In the example embodiment, the CPU 1301 determines the presence or absence of an obstructer by comparing the magnitude of contrast information in the tracking position and the magnitude of contrast information in the surrounding area. Here, contrast information on a background area without any subject therein becomes almost zero. To distinguish such a background area from the obstructer, the CPU 1301 performs the following processing. The CPU 1301 determines that there is an obstructer in a distance information calculation area having contrast information whose difference from the contrast information (in-focus evaluation value) in the tracking position is larger than a first threshold and whose value is not zero (larger than a second threshold). Here, the first threshold is set to a value larger than the threshold value used when similar relative distance information is retrieved in S308.

The following will describe another example method of detecting an obstructer. Assume that the obstructer is located on the near distance side of the subject set as the tracking target. In a state that the tracking target is in focus, a value of contrast information (in-focus evaluation value) in a case where the focus lens is moved to the near distance side (front focus side) by performing the wobbling operation is larger than a value of contrast information in a case where the focus lens is moved to the far distance side (rear focus side). A method for performing the wobbling operation when the presence or absence of an obstructer is determined, and for comparing the magnitude of contrast information when the focus lens is located on the near distance side with the magnitude of contrast information when the focus lens is located on the far distance side, may be used to determine whether or not an obstructer is present. In this case, the CPU 1301 determines that there is an obstructer when a difference between the contrast information when the focus lens is located on the near distance side and the contrast information when the focus lens is located on the far distance side, is larger than a predetermined value.

Further, in the second example, the distance information calculation area is allocated to the entire range of image data. As for a distance information calculation area in which the magnitude of contrast information is smaller than the value in the tracking position, the CPU 1301 will assume it to be an area in which there is an obstructer, even if the area is not a surrounding area near the tracking position. The CPU 1301 detects a moving direction of the area with this obstructer located therein between frames to determine the moving direction of the obstructer.

Figure 10A:
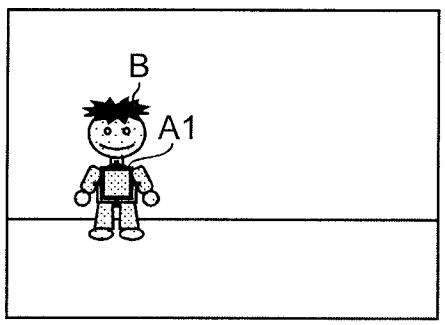
FIGS. 10A-10C are illustrations showing an example of a problem with tracking processing when the obstructer detection processing is not performed.
Figure 10B:
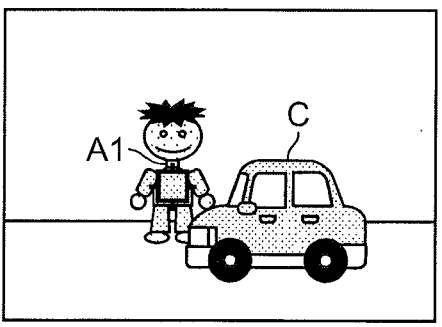

Before the embodiment is described more specifically, a case where obstructer detection processing using relative distance information is not performed will be first described. Prior to tracking processing, it is assumed that the CPU 1301 specifies a position A1 of subject B (tracked object) in a frame shown in FIG. 10A as a tracking target. In this case, the CPU 1301 sets image data shown in FIG. 10A as evaluation image data, and sets image data on the position A1 in this evaluation image data as fiducial image data for tracking processing. Then, the CPU 1301 displays a tracking frame anchored at a position corresponding to the position A1 on the display device 120.

After that, suppose that subject C (obstructer) comes close to subject B in another frame. Subject C is a subject identical in color to subject B as the tracking target. Suppose further that image data in the frame including such two or more subjects of the same color is set as reference image data to perform tracking processing. In this case, the CPU 1301 retrieves, from the reference image data, an area having color information or brightness information corresponding to the position A1 in FIG. 10A.

Figure 10C:
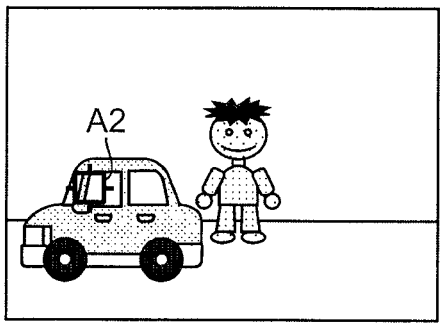

Here, suppose that the image data in the frame including the two or more subjects of the same color is set as reference image data to perform tracking processing using color information. In this case, the CPU 1301 retrieves, from the reference image data, an area having the same color as the position A1 in FIG. 10A. Therefore, as shown in FIG. 10C, there is a possibility that the CPU 1301 will mistakenly change the tracking position obtained by the tracking processing to a position A2 on subject C, rather than on subject B. In particular, if subject B is obstructed by subject C, it will become more likely that such undesired switching between tracking positions will occur. In the tracking processing using brightness information, there is no possibility that such undesired switching of the tracking position from a first subject to a second subject of the same color. However, if a subject has the same pattern as the position A1 in FIG. 10A, an undesired switching between tracking positions might occur if brightness information is used.

Thus, in the tracking processing, it is important to detect an obstructer around the tracking position.

Figure 11A:
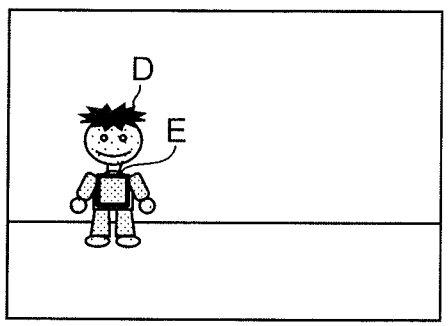
FIGS. 11A-11E are illustrations showing an example of tracking processing to which the first example of the obstructer detection processing (FIG. 7) is applied.

Applying the example obstructer detection processing shown in FIG. 7 will be described more specifically with reference to FIGS. 11A-11E. Here, as an example, it is assumed that a position E of subject D (tracked object) shown in FIG. 11A is tracked. In this case, suppose that the shooting optical system 102 has focused on subject D.

Figure 11B:
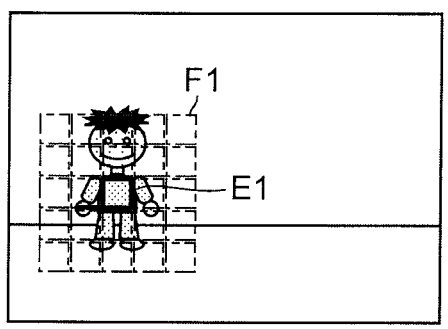

As shown in FIG. 11B, in the obstructer detection processing for a certain frame, suppose that the CPU 1301 sets a distance information calculation area F1. A tracking position calculated in this frame is a position E1. In the example of FIG. 11B, 5×5 areas having a predetermined size, respectively, are set as a distance information calculation area F1. However, the distance information calculation area F1 is not limited to 5×5 areas, and it may be 3×3 areas, 10×10 areas, etc. When setting the distance information calculation area F1, the CPU 1301 acquires contrast information as relative distance information for each of the areas constructing the distance information calculation area F1. In the example of FIG. 11B, since an area corresponding to subject. D including the tracking position E1 is located at almost the same distance from the camera as the tracking position E1, a difference in contrast information of the tracking position E1 and the rest of the subject D becomes smaller than a first threshold. On the other hand, since the other areas are the background areas that are large in distance difference from the tracking position E1 (i.e., since the other areas are out of focus), the values of contrast information of the other areas become equal to or less than a second threshold. Therefore, as a result of the processing in S302, the CPU 1301 determines that there is no obstructer around a tracking position E1.

Figure 11C:
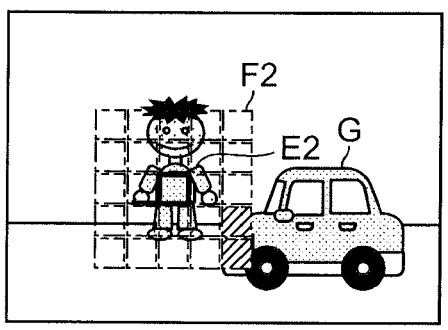

In a frame subsequently acquired and shown in FIG. 11C, an example in which subject G comes close to subject D is shown. Here, suppose that the CPU 1301 sets a distance information calculation area F2. The tracking position calculated in this frame is a position E2. When setting the distance information calculation area F2, the CPU 1301 acquires contrast information on each of the areas constructing this distance information calculation area F2. In the example of FIG. 11C, the area including subject G in the distance information calculation area F2 (a hatched portion in FIG. 11C) shows that a difference in contrast information from the tracking position E2 is larger than the first threshold. This is a difference due to a difference in distance between (1) the camera and the subject D and (2) the camera and the subject G, or the like. At the same time, the value of contrast information in the hatched portion in FIG. 11C becomes larger than the second threshold. This is because the subject G is more in-focus than the background. Therefore, in the processing of S302, the CPU 1301 determines that there is an obstructer in an area hatched in FIG. 11C. Consequently, the CPU 1301 prohibits updating the tracking position and updating the evaluation image data because of the obstructer around the distance information calculation area F2.

Figure 11D:
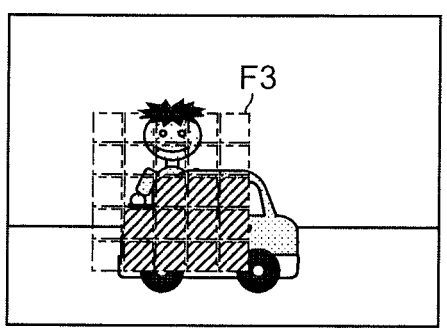

Further, in a frame subsequently acquired and shown in FIG. 11D, suppose that subject. G further comes close to subject D and the CPU 1301 sets a distance information calculation area F3 in this state. In the current frame, the CPU 1301 prohibits calculation of an updated tracking position. When setting the distance information calculation area F3, the CPU 1301 acquires contrast information as relative distance information in the tracking position E2 and the surrounding areas that construct this distance information calculation area F3, respectively. In the current frame, since the obstructer is being detected, the CPU 1301 determines whether there is contrast information similar to the contrast information in the tracking position E1 in previous frames. In the example of FIG. 11D, since the portion of the position E2 of subject D is obstructed by subject G, the CPU 1301 determines that there is no similar contrast information.

Figure 11E:
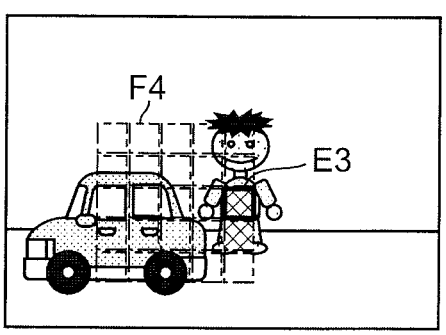

Further, in the subsequent frame, suppose that as the subject G moves past subject D as shown in FIG. 11E, the CPU 1301 sets a distance information calculation area F4. Even in this frame, the calculation of an updated tracking position is prohibited. When setting the distance information calculation area F4, the CPU 1301 acquires contrast information in each of the areas constructing this distance information calculation area F4. In the current frame, since the obstructer G is being detected, the CPU 1301 determines whether there is contrast information similar to the contrast information in the tracking position E1. In the example of FIG. 11E, since a position E3 (corresponding to the position E1) of subject D is not obstructed by subject G, the CPU 1301 determines that there is similar contrast information. Then, the CPU 1301 updates the tracking position from the position E1 to the position E3. Then, the CPU 1301 restarts updating of the evaluation image data.

Thus, according to the first example, an obstructer against even a subject whose shape changes significantly during the tracking processing can be detected appropriately. This can reduce the possibility of an unwanted switching between tracking positions, and consequently reduces the possibility that the tracking position is lost.

Figure 12A:
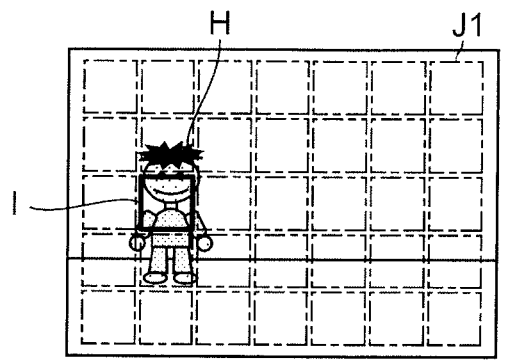
FIGS. 12A-12D are illustrations showing an example of tracking processing to which the second example of the obstructer detection processing (FIG. 8) is applied.

Next, a case where the obstructer detection processing shown in FIG. 8 is applied will be described more specifically with reference to FIGS. 12A-12D. Here, it is assumed as an example that a position I of subject H shown in FIG. 12A is tracked. As shown in FIG. 12A, in the obstructer detection processing shown in FIG. 8, a distance information calculation area is allocated in the second example. In other words, the entire image data becomes a distance information calculation area J1.

Figure 12B:
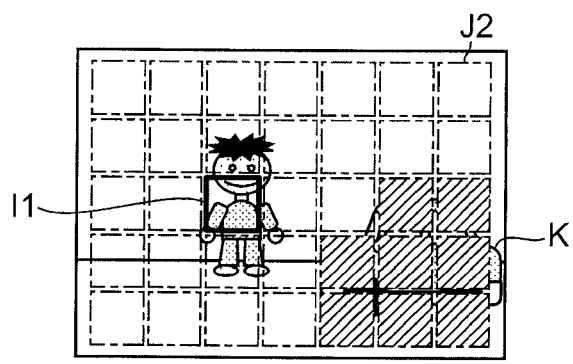

In the obstructer detection processing for a certain frame, suppose that subject K (obstructer) comes close to subject H (tracked object) as shown in FIG. 12B and the CPU 1301 sets a distance information calculation area J2 in this state. When setting the distance information calculation area J2, the CPU 1301 acquires contrast information in each of the areas included in the distance information calculation area J2. In the example of FIG. 12B, an area including subject K (a hatched portion in FIG. 12B) has contrast information whose difference from the contrast information in a tracking position I1 is larger than the first threshold and whose value is larger than the second threshold. Therefore, the CPU 1301 determines that there is an obstructer in this hatched portion. In the example of FIG. 12B, since the moving direction of the obstructer (subject K) is towards the tracking position I1 (YES in S404 of FIG. 8), the tracking processing performed by the tracking processing circuit 1305, 1306 is second tracking processing (S406) as processing when there is an obstructer.

Here, in the processing shown in the flowchart of FIG. 8, updating the evaluation image data is prohibited. However, when the second processing is performed, updating the evaluation image data and tracking processing may be enabled. In the second tracking processing, for example, when tracking processing using color information is performed, the resolution of color information to be acquired is increased. Therefore, even if there is an obstructer of a similar color, the tracking processing circuit 1306 can determine a slight color difference (due to the increase resolution) between the tracked object and the obstructer. In this way, the CPU 1301 can reduce the possibility of mistakenly switching the tracking position from the tracked object to the obstructer.

Figure 12C:
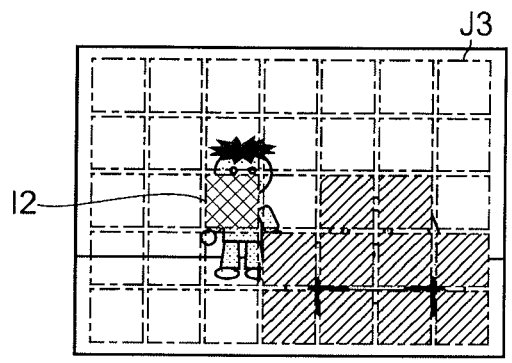

In the obstructer detection processing for a frame subsequently acquired, suppose that subject K comes closer to subject H as shown in FIG. 12C and the CPU 1301 sets a distance information calculation area J3 in this state. When setting the distance information calculation area J3, the CPU 1301 acquires contrast information in each of the areas included in the distance information calculation area J3. In the example of FIG. 12C, an area including subject K (a hatched portion in FIG. 12C) has contrast information whose difference from the contrast information in a tracking position I2 is larger than the first threshold and whose value is larger than the second threshold. Therefore, the CPU 1301 determines that there is an obstructer in this hatched portion. In the example of FIG. 12C, since the obstructer (subject K) is moving towards the tracking position I2, the tracking processing performed by the tracking processing circuit 1305, 1306 is the second tracking processing (processing when there is an obstructer).

Figure 12D:
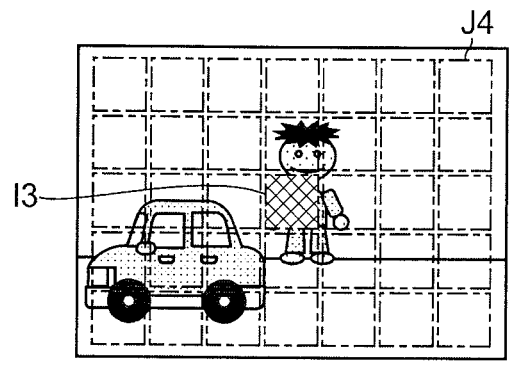

In the obstructer detection processing for a frame subsequently acquired, suppose that subject K moves away from subject H as shown in FIG. 12D and the CPU 1301 sets a distance information calculation area J4 in this state. When setting the distance information calculation area J4, the CPU 1301 acquires contrast information in each of the areas included in the distance information calculation area J4. In the example of FIG. 12D, since the obstructer (subject K) is moving away from a tracking position I3, the tracking processing performed by the tracking processing circuit 1305, 1306 is first tracking processing (processing when there is no obstructer).

Thus, according to the second example, an obstructer against even a subject whose shape changes significantly during the tracking processing can be detected correctly. This can reduce the possibility of mistakingly switching between tracking positions, and hence reduces the possibility of losing the desired tracking position. Further, when an obstructer is detected, the tracking processing can be changed from the first tracking processing (processing when there is no obstructer) to the second tracking processing (processing suitable when there is an obstructer) to continue to track the tracking target.

The above describes the present invention based on various example embodiments, but the present invention is not limited to the aforementioned embodiment. Various modifications and applications are, of course, possible within the scope of the invention.

For example, in the above-mentioned examples, updating the evaluation image data is prohibited when it is determined that there is an obstructer around the tracking position. In contrast to this, for example, in the tracking processing using color information, when the subject in the tracking position and the obstructer have different color information, updating of the evaluation image data may not need to be prohibited. Further, even in the tracking processing using brightness information, for example, when the subject in the tracking position and the obstructer have different patterns, updating of the evaluation image data may not need to be prohibited.

Further, in the above-mentioned examples, use of contrast information (in-focus evaluation value) as relative distance information is described, but any information other than the contrast information can be used as the relative distance information as long as it can determine the magnitude of the difference between the distance to the other subject and the distance to the tracking position. For example, a defocus amount can be used as the relative distance information if the imaging apparatus is to focus the focus lens in phase-difference AF processing.

The phase-difference AF processing is processing for detecting a paired light beams that have passed through different exit pupils of the focus lens, calculating a gap in detection position (phase difference) between the pared light beams as a defocus amount, and driving the focus lens to eliminate this defocus amount to focus the focus lens. The subject distance can be calculated directly from the defocus amount.

Figure 13A:
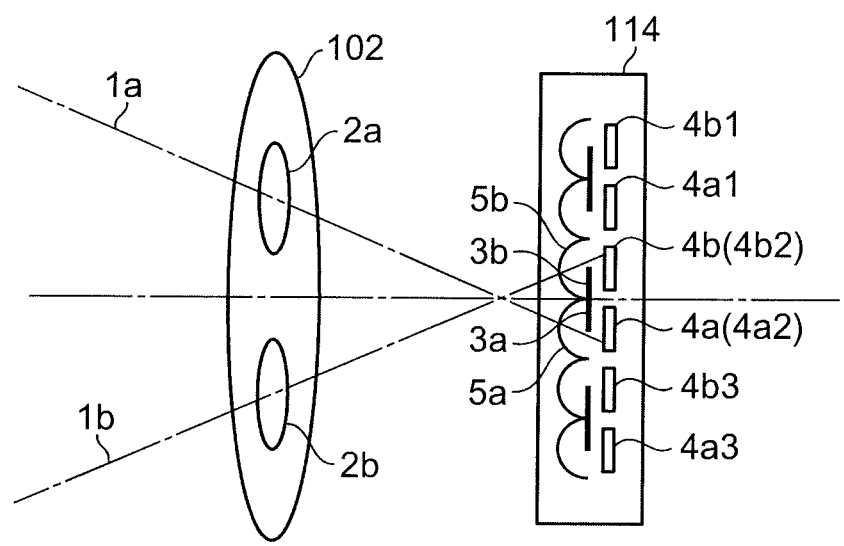
FIGS. 13A and 13B are diagrams for describing a case where a defocus amount is used as relative distance information.

FIG. 13A is a diagram showing the structure of an imaging apparatus including the tracking device in which some pixels on the light-receiving surface of the image pickup device 114 are used as pixels for phase difference detection. The structure of this imaging apparatus can be applied to the structure shown in FIG. 1. In this case, however, the AF control circuit 1302 is a circuit for controlling the phase-difference AF processing.

As shown in FIG. 13A, pixel columns 4a and 4b for AF are formed on the image pickup device 114. In the example of FIG. 13A, the pixel column 4a has three pixels 4a1, 4a2, and 4a3. The pixel column 4b has also three pixels 4b1, 4b2, and 4b3. Then, the pixels that construct the pixel column 4a and the pixels that construct the pixel column 4b are alternately arranged. Here, in the example of FIG. 13A, the pixels are continuously arranged, but they may be arranged discretely. For example, a pixel used for acquiring image data may be arranged between the pixel 4a1 and the pixel 4b1. Further, the number of pixels that construct a pixel column is not limited to three.

Each of the pixels that construct the pixel column 4a is a pixel receiving a light beam 1a from an upper portion 2a of an exit pupil of the shooting optical system 102, where the upper portion of the light-receiving part is shielded by a light-shielding part 3a so that only a lower portion of the light-receiving part will be exposed. On the other hand, each of the pixels that construct the pixel column 4b is a pixel receiving a light beam 1b from a lower portion 2b of another exit pupil of the shooting optical system 102, where the lower portion of the light-receiving part is shielded by a light-shielding part 3b so that only an upper portion of the light-receiving part will be exposed.

Further, microlenses 5a and 5b are arranged to respond to respective pixels. The microlens 5a focuses the light beam 1a from the upper portion 2a of the exit pupil on each of the pixels in the pixel column 4a through an opening formed by the light-shielding part 3a, respectively. The microlens 5b focuses the light beam 1b from the lower portion 2b of the exit pupil on each of the pixels in the pixel column 4b through an opening formed by the light-shielding part 3b.

Figure 13B:
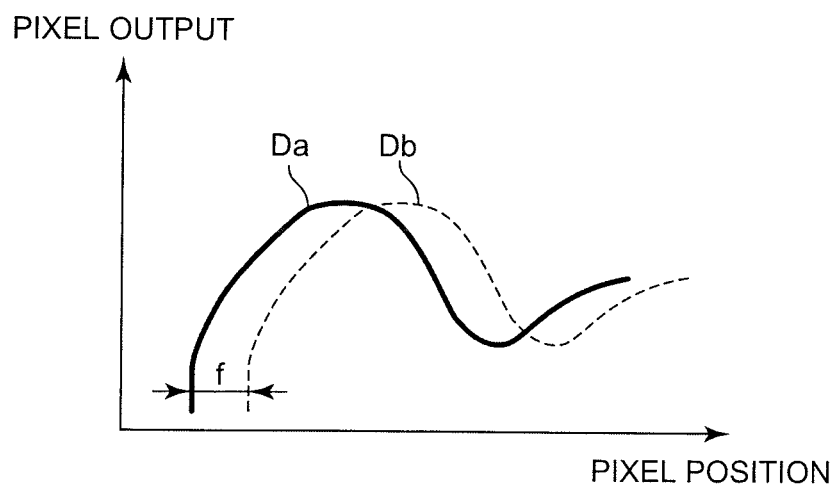

In the structure as shown in FIG. 13A, it is assumed that pixel output from the pixel column 4a is referred to as "a" column pixel output, and pixel output from the pixel column 4b is referred to as "b" column pixel output. In FIG. 13B, the "a" column pixel output as output of the pixels 4a1 to 4a3 is labeled Da and the "b" column pixel output as output of the pixels 4b1 to 4b3 is labeled Db. Thus, in the phase-difference AF processing, pared image data Da and Db are generated. Then, a phase difference f occurs between the "a" column pixel output Da and the "b" column pixel output Db in the array direction of the pixel columns. This phase difference f corresponds to the defocus amount. As a method of calculating the phase difference f, a method of determining correlation between the "a" column pixel output Da and the "b" column pixel output Db can be applied. Since this method is publicly known, a detailed description thereof will be omitted.

Here, when pixel columns for phase difference detection are used on the image pickup device 114, the pixel columns can be arranged across the entire light-receiving surface of the image pickup device 114 to determine a defocus amount throughout the entire area of the shooting screen.

When a tracking target is set as a focusing target, the defocus amount becomes zero at the tracking position. Then, with increasing distance from the tracking position to the far distance side (front focus side) or the near distance side (rear focus side), the absolute value of the defocus amount becomes large (where the value is negative on the far distance side or positive on the near distance side). An obstructer can be detected from the relationship of defocus amount magnitudes with respect to the tracking position in the same manner as in the case of contrast information. When a difference between the defocus amount of the tracking position and the defocus amount of each of the surrounding areas is smaller than a predetermined amount, the CPU 1301 determines that an object on the near distance side is located in the surrounding area. In this case, the CPU 1301 determines that there is an obstructer in the surrounding area. The subject distance may also be determined directly from the defocus amount to detect an obstructer.

In the example of FIGS. 13A and 13B, it is shown an example in which pixel columns for phase difference detection are provided on the light-receiving surface of the image pickup device 114. On the other hand, a known TTL phase difference detection unit as a unit separate from the image pickup device may be provided in the imaging apparatus including the tracking device to detect a defocus amount. Further, an ambient light type phase difference detection unit for detecting a light beam different from the light beam passing through the shooting optical system may be provided in the imaging apparatus including the tracking device to determine a subject distance.

In addition, the aforementioned example embodiments include various inventions so that various inventions can be extracted by proper combinations of disclosed multiple constituent features. For example, even if some constituent features are omitted from all the constituent features shown in an example embodiment, a structure with the constituent features omitted can be extracted as an invention as long as the above-mentioned problem can be solved and the above-mentioned effect can be obtained.

Additional advantages and modifications will readily occur to those skilled in the art. Therefore, the invention in its broader aspects is not limited to the specific details and the representative example embodiments shown and described herein. Accordingly, various modifications may be made without departing from the spirit or scope of the general inventive concept as defined by the appended claims and their equivalents.

What is claimed is:

1. A tracking device comprising:
    an imaging part for capturing a subject image and repeatedly acquiring image data on the subject image;
    a tracking processing part for setting a tracking position based on first image data of the repeatedly acquired image data to perform tracking processing on a subject in the tracking position based on second image data acquired after the first image data;
    a relative distance information calculating part for calculating relative distance information using (1) a determined information about a distance to the tracking position and (2) a determined information about a distance to a surrounding area around the tracking position; and
    a color tracking processing part, which is included in the tracking processing part, for (1) acquiring color information based on the first image data, (2) searching for an area having an identical or similar color to the color information acquired on the second image data, and (3) performing tracking processing using any area found in the search,
    wherein the tracking processing part determines, based on the determined information about a distance to a surrounding area, whether another subject in the surrounding area is moving towards the tracking position, and responsive to a determination that the other subject in the surrounding area is moving towards the tracking position, the color tracking processing part increases a resolution of the color information acquired and used when searching for areas with identical or similar colors, and
    wherein the tracking processing part determines whether the other subject in the surrounding area is located at a closer range than the subject in the tracking position based on the relative distance information calculated, and responsive to a determination that the other subject in the surrounding area is located at the closer range than the subject in the tracking position, prohibiting tracking processing by the tracking processing part.

2. The tracking device according to claim 1, further comprising
    a storage part for storing the first image data as evaluation image data and the second image data as reference image data, wherein
    the tracking processing part searches the reference image data for the tracking position set on the evaluation image data to perform tracking processing while updating the reference image data to the evaluation image data to repeatedly perform tracking processing, and
    responsive to the determination that the other subject in the surrounding area is located at a closer range than the subject in the tracking position, prohibiting updating of the reference image data to the evaluation image data by the tracking processing part.

3. The tracking device according to claim 1, further comprising
    a storage part for storing separately relative distance information calculated in the tracking position,
    wherein the tracking processing part determines whether the separate relative distance information calculated by the relative distance information calculating part after the tracking processing is prohibited falls within a predetermined range with respect to the relative distance information in the tracking position stored in the storage part when the tracking processing is prohibited, and responsive to a determination that the separate relative distance information is within the predetermined range, restarting the tracking processing by the tracking processing part.

4. The tracking device according to claim 1, further comprising a focus lens incorporated in a shooting optical system to guide a shooting light beam to the imaging part and driven to focus the shooting light beam on the shooting optical system, wherein the relative distance information calculating part calculates contrast information on the image data when the tracking position is set as a focusing target of the focus lens, and wherein the relative distance information is determined from (1) contrast information calculated at the tracking position and (2) contrast information calculated at the surrounding area.

5. The tracking device according to claim 1, further comprising a focus lens incorporated in a shooting optical system to guide a shooting light beam to the imaging part and driven to focus the shooting light beam on the shooting optical system, and a focus lens drive part for driving the focus lens in an optical axis direction, wherein the relative distance information calculating part calculates, for the surrounding area, first contrast information when the focus lens is moved to a near distance side by the focus lens drive part and calculates second contrast information when the focus lens is moved to a far distance side by the focus lens drive part, and the tracking processing part compares the first contrast information with the second contrast information, and prohibits or permits the tracking processing according to the comparison result.

6. The tracking device according to claim 5, wherein the tracking processing part prohibits the tracking processing responsive to a determination that a difference between the first contrast information and the second contrast information is larger than a predetermined value.

7. The tracking device according to claim 1, further comprising a focus lens incorporated in a shooting optical system to guide a shooting light beam to the imaging part and driven to focus the shooting light beam on the shooting optical system, wherein the relative distance information calculating part calculates a first defocus amount when the tracking position is set as a focusing target of the focus lens, calculates a second defocus amount when the surrounding area is set as a focusing target of the focus lens, and calculates the relative distance information using the first and second defocus amounts.

8. The tracking device according to claim 7, wherein the tracking processing part compares the first defocus amount in the tracking position with the second defocus amount in the surrounding area, and responsive to a determination that the second defocus amount in the surrounding area is on a rear focus side of the first defocus amount in the tracking position, prohibiting the tracking processing by the tracking processing part.

9. A tracking device comprising:

an imaging part for capturing a subject image and repeatedly acquiring image data on the subject image;

a tracking processing part for setting a tracking position based on first image data of the repeatedly acquired image data to perform tracking processing on a subject in the tracking position based on second image data acquired after the first image data;

a relative distance information calculating part for calculating relative distance information using both (1) a determined information about a distance to the tracking position and (2) a determined information about a distance to a surrounding area around the tracking position; and a color tracking processing part for (1) acquiring color information based on the first image data, (2) searching for an area having an identical or similar color to the color information acquired on the second image data, and (3) performing tracking processing using any area found in the search, wherein, the tracking processing part determines, based on the determined information about a distance to the surrounding area, whether another subject in the surrounding area is moving towards the tracking position, and responsive to a determination by the tracking processing part, based on the relative distance information calculated, that the other subject in the surrounding area is moving towards the tracking position, the color tracking processing part increases a resolution of the color information acquired and used when searching for areas with identical or similar colors.

10. The tracking device according to claim 9, wherein the surrounding area is allocated to an entire range of the repeatedly acquired image data.

11. The tracking device according to claim 9, further comprising a focus lens incorporated in a shooting optical system to guide a shooting light beam to the imaging part and driven to focus the shooting light beam on the shooting optical system, wherein the relative distance information calculating part calculates first contrast information on the image data when the tracking position is set as a focusing target of the focus lens, calculates second contrast information on the image data when the surrounding area is set as a focusing target of the focusing lens, and determines relative distance information from the first and second contrast information calculated.

12. The tracking device according to claim 9, further comprising a focus lens incorporated in a shooting optical system to guide a shooting light beam to the imaging part and driven to focus the shooting light beam on the shooting optical system, and a focus lens drive part for driving the focus lens in an optical axis direction, wherein the relative distance information calculating part calculates, for the surrounding area, first contrast information when the focus lens is moved to a near distance side by the focus lens drive part and calculates second contrast information when the focus lens is moved to a far distance side by the focus lens drive part, and the tracking processing part compares the first contrast information with the second contrast information to determine whether the other subject in the surrounding area is located at a closer range than the subject in the tracking position.

13. The tracking device according to claim 12, wherein the tracking processing part determines that the other subject in the surrounding area is located at the closer range when a difference between the first contrast information and the second contrast information is larger than a predetermined amount.

14. The tracking device according to claim 9, further comprising a focus lens incorporated in a shooting optical system to guide a shooting light beam to the imaging part and driven to focus the shooting light beam on the shooting optical system, wherein the relative distance information calculating part calculates a first defocus amount when the tracking position is set as a focusing target of the focus lens, calculates a second defocus amount when the surrounding area is set as a focusing target of the focusing lens, and calculates the relative distance information using the first and second defocus amounts.

15. The tracking device according to claim 14, wherein the tracking processing part compares the defocus amount in the tracking position with the defocus amount in the surrounding area, and responsive to a determination that the second defocus amount in the surrounding area is on a rear focus side of the first defocus amount in the tracking position, determining that the other subject in the surrounding area is located at a closer range than the subject in the tracking position by the tracking processing part.

16. A tracking method using an imaging part for capturing a subject image and repeatedly acquiring image data on the subject image, in which a tracking position is set based on first image data of the repeatedly acquired image data to perform tracking processing on a subject in the tracking position based on second image data acquired after the first image data, the tracking method comprising:

acquiring color information based on the first image data;

searching for an area having an identical or similar color to the color information acquired on the second image data;

performing tracking processing using any area found in the search;

calculating relative distance information using (1) a determined information about a distance to the tracking position and (2) a determined information about a distance to a surrounding area around the tracking position; and determining whether another subject in the surrounding area is moving towards the tracking position, and responsive to a determination that the other subject in the surrounding area is moving towards the tracking position, increasing a resolution of the color information acquired and used when searching for areas with identical or similar colors.

* * * * *